March 30, 1965 W. N. GARWICK ETAL 3,175,288
TRAY PACK PROCESSING CUTTER
Original Filed Aug. 5, 1960 6 Sheets-Sheet 1

INVENTORS
WILLIAM N. GARWICK, &
RAY E. CLARK
BY
McMorrow, Berman + Davidson
ATTORNEYS

March 30, 1965 W. N. GARWICK ETAL 3,175,288
TRAY PACK PROCESSING CUTTER
Original Filed Aug. 5, 1960 6 Sheets-Sheet 2

INVENTORS
WILLIAM N. GARWICK, &
RAY E. CLARK
BY
McMorrow, Berman & Davidson
ATTORNEYS

United States Patent Office 3,175,288
Patented Mar. 30, 1965

3,175,288
TRAY PACK PROCESSING CUTTER
William N. Garwick, 2058 Arroyo Ave., Pomona, Calif., and Ray E. Clark, 3053 Corbridge Lane, Rockford, Ill.
Continuation of application Ser. No. 47,671, Aug. 5, 1960.
This application May 7, 1964, Ser. No. 366,685
11 Claims. (Cl. 30—2)

This application is a continuation of our application Serial No. 47,671 filed August 5, 1960 and now abandoned.

This invention relates to apparatus for slitting cartons, and more particularly to a device for separating a carton or similar container into a plurality of segments, including top and bottom portions which may be employed as trays to support respective layers of cans or similar containers of food, or the like, packed in the cartons.

A main object of the invention is to provide a novel and improved device for use in retail grocery stores and similar establishments for cutting cardboard cartons of merchandise to form trays, comprising the top and bottom portions of the cartons, so as to provide a convenient and useful means for handling the cans or similar containers in the cartons and for conveniently marking and displaying such cans.

A further object of the invention is to provide an improved apparatus for slitting cardboard cartons or similar containers of cans of food, or the like, so as to form top and bottom trays adapted to support the adjacent layers of cans for subsequent handling, the apparatus being relatively simple in construction, being reliable in operation, and enabling the handling of an entire layer of cans of food, or similar merchandise, at one time, instead of requiring the individual handling of each can, as has been heretofore necessary.

A still further object of the invention is to provide an improved apparatus for simultaneously forming top and bottom trays from a carton containing cans of feed, or similar merchandise, so that the trays may be employed for the subsequent handling of the adjacent layers of cans, the apparatus involving relatively inexpensive components, being durable in construction, being easily adjustable so as to vary the height of the trays cut from the carton, and also being easily adjustable to vary the depth of cut, in accordance with the thickness of the carton material.

A still further object of the invention is to provide an improved apparatus for use in retail grocery stores and similar establishments for cutting cardboard cartons containing cans of food or similar merchandise, the apparatus enabling the cartons to be cut so that the top and bottom portions thereof define trays for subsequently handling the adjacent layers of cans packed in the carton, the apparatus providing rapid cutting of the carton, being safe to use, and providing substantial saving in time and labor in the process of opening cartons and handling the contents thereof.

A still further object of the invention is to provide an improved apparatus for cutting cardboard cartons containing cans of food or similar merchandise and for simultaneously forming trays at the top and bottom of the carton for subsequently carrying the adjacent layers of cans so that the cans may be handled in bulk instead of individually in subsequent operations, such as in marking the cans and in arranging the cans for display.

Further objects and advantages of the invention will become apparent from the following description and claims, and from the accompanying drawings, wherein:

Referring to the drawings, the improved carton-cutting apparatus is designated generally at 20. The apparatus 20 comprises a horizontal base plate 21 provided at its respective ends with upstanding vertical flanges 22 and 23. Rigidly secured to the top portions of the flanges 22 and 23 are the respective inwardly facing opposing vertical channel bars 24 and 25, said channel bars being rigidly connected by spaced opposing, generally Y-shaped horizontal cross bars 26 and 27, the upper cross bar 26 being erect, and the lower cross bar 27 being inverted, as is clearly shown in FIGURE 8, to define respective guide tracks, as will be presently described. The vertical structure defined by the elements 24, 25, 26 and 27 constitutes a rigid supporting frame which is mounted vertically on the flanges 22 and 23 so as to be rigidly united with the base plate 21.

Figure 16:
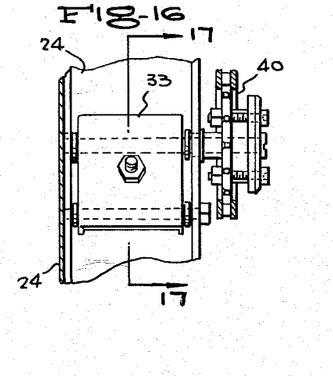
FIGURE 16 is an enlarged vertical cross sectional detail view taken substantially on the line 16—16 of FIGURE 5.
Figure 17:
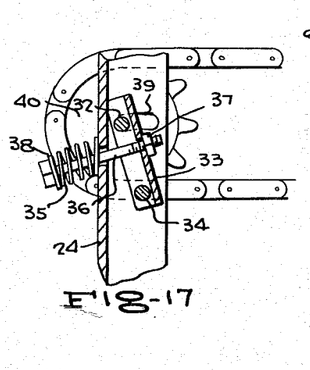
FIGURE 17 is a vertical cross sectional view taken on the line 17—17 of FIGURE 16.

Rigidly secured to and extending transversely in the intermediate portion of the vertical channel bar 25 is a first sprocket shaft 28 on which is journaled a double sprocket assembly 29 comprising the respective rigidly connected sprocket wheel elements 30 and 31. Designated at 32 is a second sprocket shaft which is adjustably mounted on the intermediate portion of the vertical channel bar 24 opposite the sprocket shaft 28, and which is supported on a pivoted channel member 33 provided in the channel bar 24, as shown in FIGURES 16 and 17. The channel member 33 is pivotally mounted on a transversely extending pivot shaft 34 secured horizontally in the channel bar 24 and is biased in a counterblockwise direction, as viewed in FIGURE 17 by a coiled spring 35 which surrounds a bolt 36 extending through the main wall portion of the channel member 33 and provided with a retaining nut 37 thereon, as shown in FIGURE 17. The head of the bolt 36 bears against a washer 38, and the coiled spring 35 bears between the washer 38 and the main wall of the vertical channel bar 24, whereby the spring 35 acts on the bolt 36 to urge the channel member 33 in a counterclockwise direction, as viewed in FIGURE 17. The sprocket shaft 32 is secured transversely to the channel member 33 and extends through an arcuate slot 39 provided in the rear flange of the vertical channel bar 24. Journaled on the sprocket shaft 32 is the sprocket wheel assembly 40.

A sprocket chain 41 is mounted on the sprocket wheels 31 and 40 and is held in tension by the biasing action of the coiled spring 35, which acts to urge the sprocket wheel assembly 40 outwardly relative to the opposing sprocket wheel 31.

Figure 5:
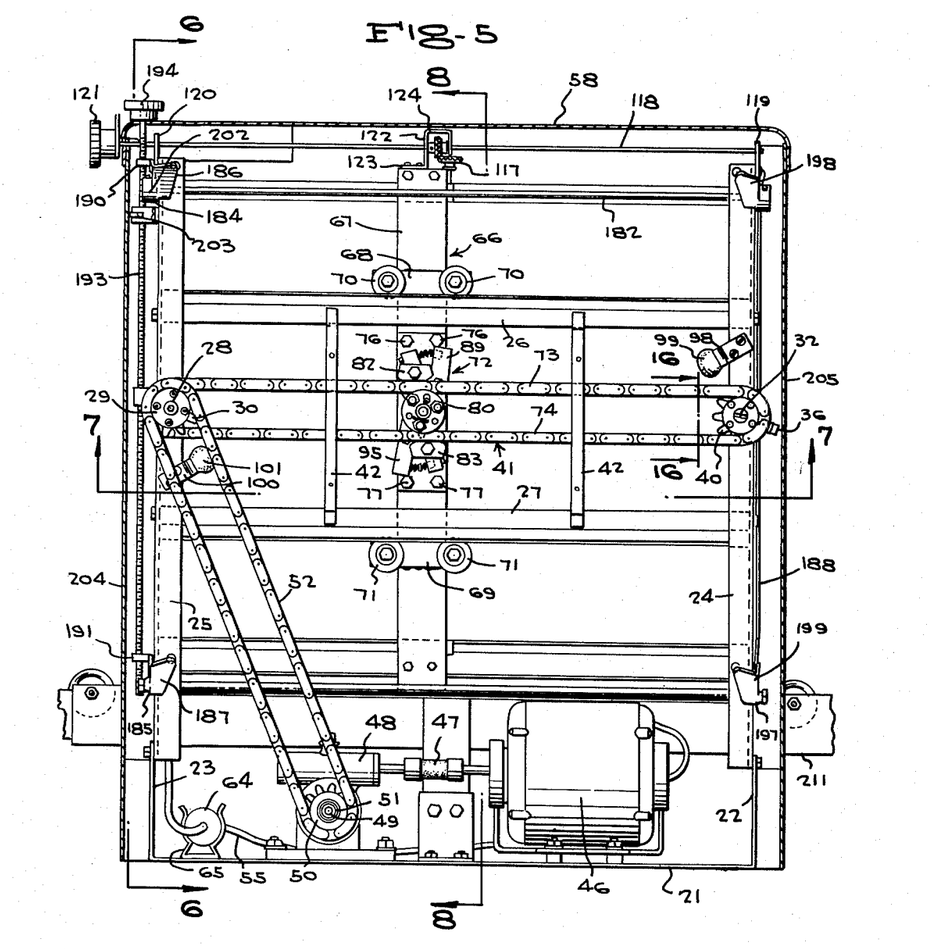
FIGURE 5 is an enlarged vertical cross sectional view taken substantially on the line 5—5 of FIGURE 1.
Figure 7:
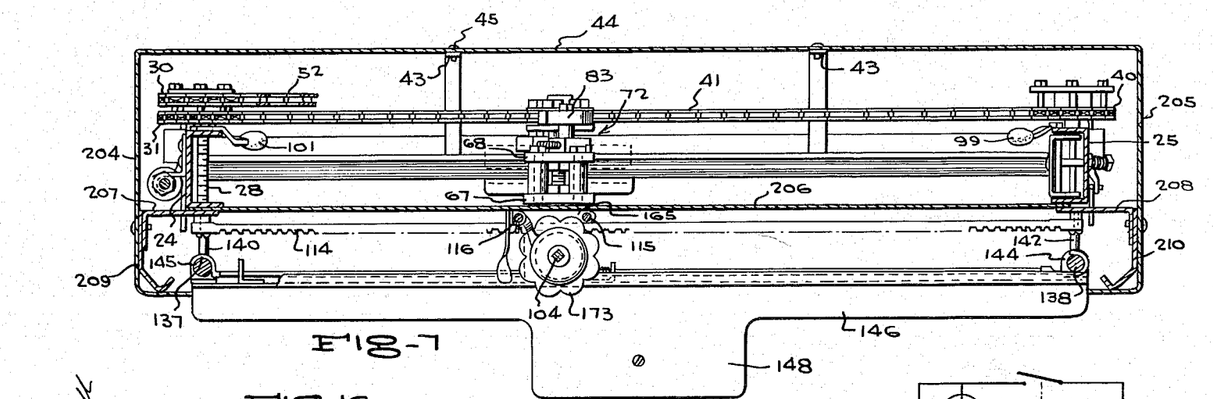
FIGURE 7 is an enlarged horizontal cross sectional view taken substantially on the line 7—7 of FIGURE 5.

As shown in FIGURE 5, the top and bottom cross bars 26 and 27 are further braced by the provision of a pair of vertical brace bars 42, 42, said bars 42 being generally U-shaped and having vertical bight portions offset rearwardly from the members 26, 27, said vertical bight portions being shown at 43 and serving as supporting means for the vertical rear cover 44 of the device, said cover 44 being fastened to the bight portions 43 by suitable fastening screws 45, as shown in FIGURE 7.

Mounted on the base plate 21 is an electric motor 46 whose shaft is connected by a flexible coupling assembly 47 to the input shaft of a speed reducing assembly 48 likewise mounted on the base plate 21 and having the output shaft 49. A sprocket wheel 50 is mounted on the shaft 49 and is yieldably connected thereto by a spiral coupling spring 51 so that the sprocket wheel 50 is driven from the speed reducing unit 48 through the coupling spring 51. A sprocket chain 52 is mounted on the sprocket wheel 50 and the sprocket wheel 30, thus coupling the motor 46 to the horizontally extending sprocket chain 41.

The spring 51 does not act to directly transmit torque from the output shaft 49 of the speed reducing unit 48 but acts on a coupling collar 49' splined on the shaft 49 and provided with coupling ribs 50' which engage in coupling grooves 51' formed in a collar portion 52' provided on the sprocket wheel 50. The sprocket wheel 50 bears against an annular bearing shoulder 53' on the shaft 49 and is normally rotatable on the shaft, except that it is coupled thereto by the engagement of the ribs 50' in the grooves 51', thus yieldingly coupling the sprocket wheel 50 to the shaft 49 against the tension of the coupling spring 51. When the mechanism becomes jammed or is overloaded, this provides protection for the motor 46 by allowing sprocket wheel 50 to be uncoupled from shaft 49 against the compression of spring 51.

Figure 18:
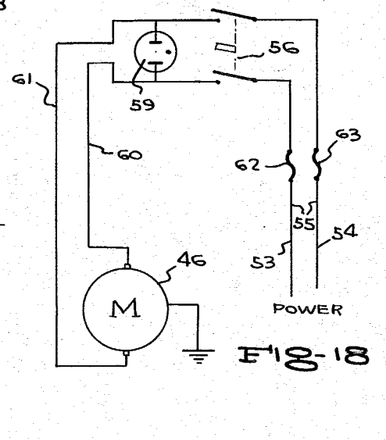
FIGURE 18 is a schematic wiring diagram showing the electrical connections of the apparatus of FIGURES 1 to 17.

As shown in FIGURE 18, the motor 46 is energized from the conductors 53 and 54 of a line cord 55 through the poles of a double pole single throw main control switch 56 mounted on the depending front vertical flange 57 of a top cover member 58, forming part of the housing of the device. Also mounted on the front flange 57 adjacent the switch 56 is a neon lamp 59 which is connected in parallel with the motor energizing wires 60 and 61, as shown in FIGURE 18, the wires 60 and 61 being connected to the line wires 53 and 54 through the poles of the switch 56 and through suitable protector fuses 62 and 63 mounted in suitable fuse cases 64 and 65 secured on the front flange 57 of top cover 58.

As shown in FIGURE 5, the line cord 55 is provided with a conventional plug connector 64 removably mounted in a supporting spring clip member 65 secured on the base plate 21.

As will be readily apparent, when the motor 46 is energized, the motor transmits torque through the flexible coupling 47 and the speed reducing unit 48 to the sprocket drive shaft 49, which in turn transmits torque through the coupling spring 51 to the sprocket wheel 50. This drives the chain 52 and rotates the sprocket wheels 30 and 31, thus driving the chain 41.

Designated generally at 66 is a horizontally movable carriage assembly which includes a main vertical supporting bar 67 to which are rigidly secured respective transversely extending horizontal bracket members 68 and 69 located adjacent the respective cross bar members 26 and 27. Journaled on the upper bracket member 68 are guide rollers 70, 70 which engage in the upper trough element of the top cross bar 26. Journaled on the bottom bracket member 69 are similar spaced guide rollers 71, 71 which engage in the downwardly facing trough portion of the lower cross bar 27, as is clearly shown in FIGURE 8, thus guiding the carriage assembly 67 for horizontal movement along the cross bars 26 and 27.

Figures 8, 9, 10, 11:
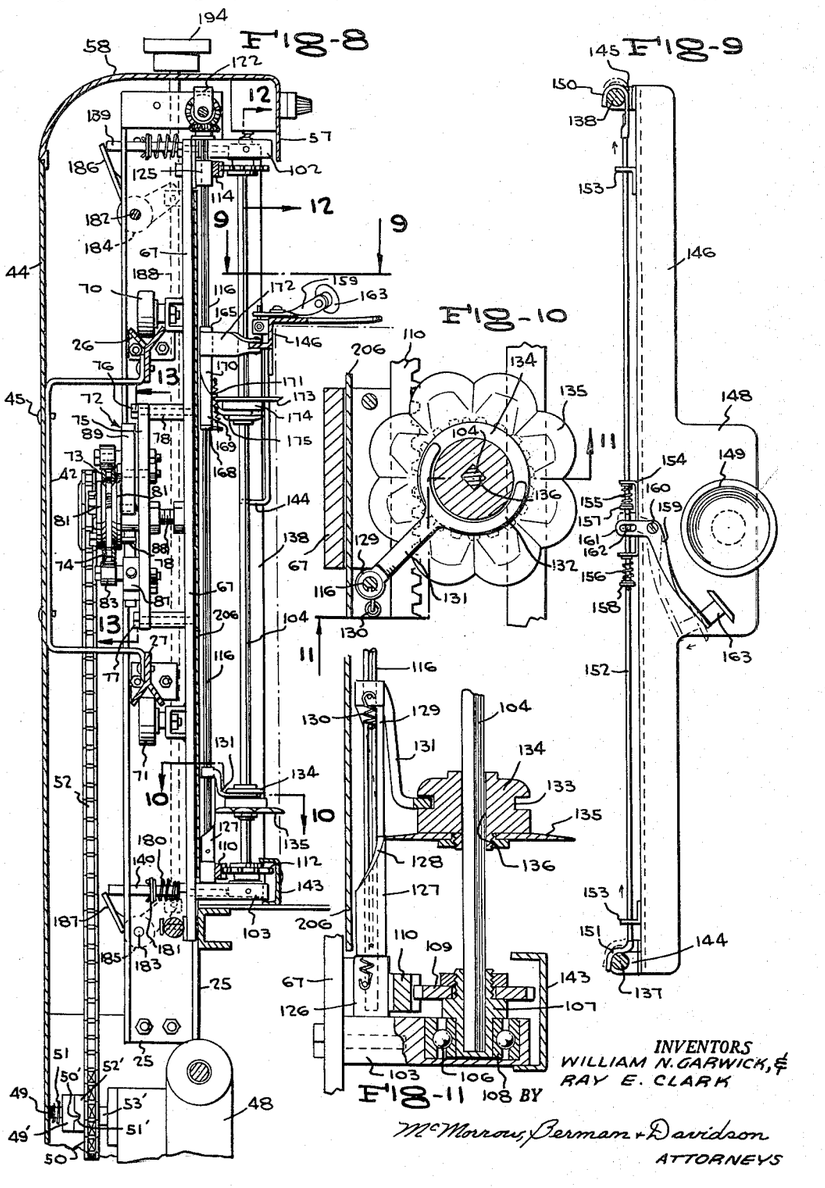
FIGURE 8 is an enlarged vertical cross sectional view taken substantially on the line 8—8 of FIGURE 5.
FIGURE 9 is a horizontal cross sectional view taken substantially on the line 9—9 of FIGURE 8.
FIGURE 10 is an enlarged horizontal cross sectional detail view taken substantially on the line 10—10 of FIGURE 8.
FIGURE 11 is a vertical cross sectional view taken substantially on the line 11—11 of FIGURE 10.

Mounted on the vertical bar member 67 is a reversing clutch assembly, designated generally at 72 which alternately couples the carriage assembly 66 to the top and bottom portions of the sprocket chain 41, designated respectively at 73 and 74 to cause the carriage member 66 to move horizontally back and forth between the vertical bar members 24 and 25. Thus, the clutch assembly 72 comprises a vertical supporting plate 75 which is secured to the vertical bar member 67 in transverse relationship to the sprocket chain 41, as by respective pairs of top and bottom fastening bolts 76, 76 and 77, 77 provided with spacer sleeves 78 mounted on the bolts and disposed between the plate member 75 and the main vertical supporting bar 67. A horizontal shaft member 78a is rigidly secured to the plate member 75 and the bar member 67 and extends midway between the top and bottom portions 73 and 74 of the sprocket chain 41. The sprocket member 79 is journaled on the shaft 78a, said sprocket member being provided with three equally spaced sprocket teeth 80 which are at times drivingly engageable with the top and bottom sprocket chain portions 73 and 74 in a manner presently to be described. The sprocket member 79 is provided with the inwardly beveled circular guide flanges 81, 81 located on opposite sides of the sprocket teeth 80 and defining annular guide recesses therebetween adapted to receive the top and bottom portions 73 and 74 of the sprocket chain 41, as shown in FIGURE 8. Respective guide blocks 82 and 83 are pivotally mounted above and below the top and bottom portions 73 and 74 of the sprocket chain to maintain said top and bottom chain portions in the aforesaid annular recess defined between the flanges 81, 81, said guide blocks being pivoted on respective horizontal supporting bolts 84, and 85 secured to respective supporting blocks 86 and 87 located adjacent the vertical plate member 75 and rigidly secured thereto.

Figures 6, 13, 14, 15:
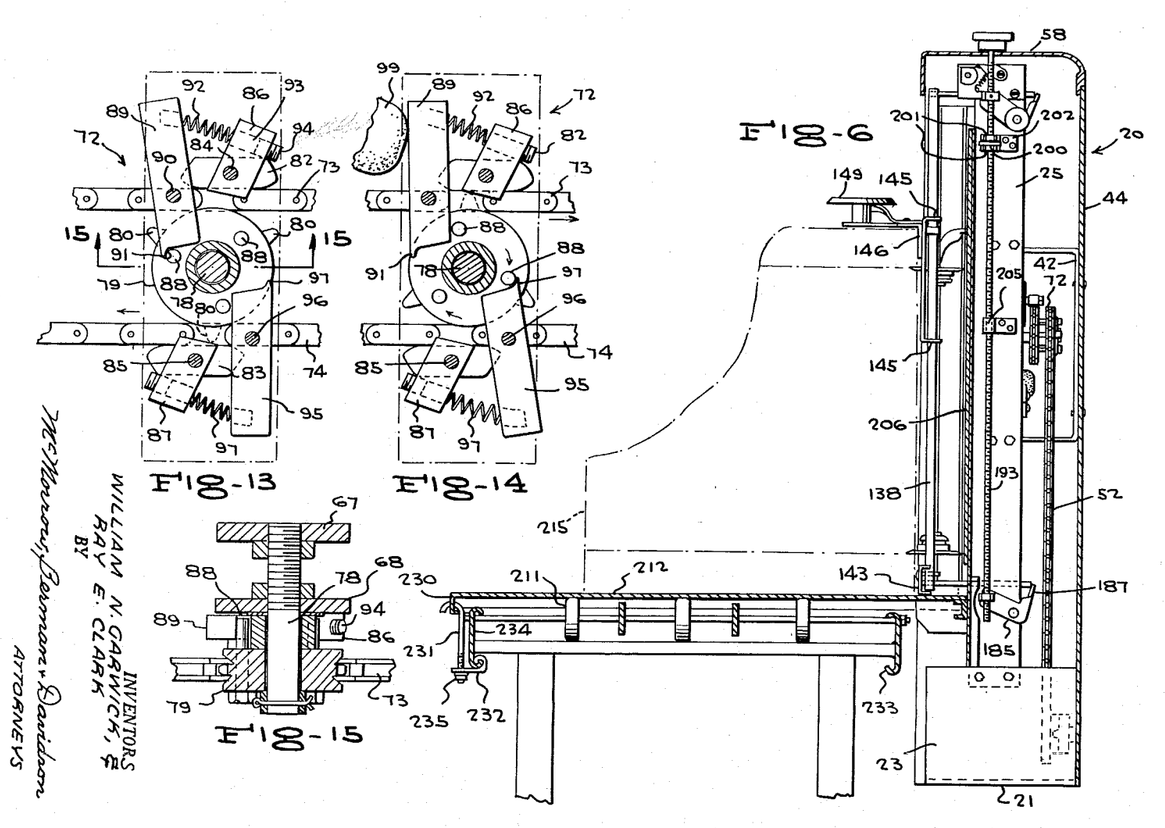
FIGURE 6 is a vertical cross sectional view taken substantially on the line 6—6 of FIGURE 5.
FIGURE 13 is an enlarged vertical cross sectional detail view taken on the line 13—13 of FIGURE 8.
FIGURE 14 is a vertical cross sectional view, similar to FIGURE 13, but showing the positions of the elements thereof resulting from the movement of the assembly to its limiting position at the end of its horizontal movement, causing a reversal in direction of the assembly.
FIGURE 15 is a horizontal cross sectional view taken substantially on the line 15—15 of FIGURE 13.

Three equally spaced stop pins 88 are secured to the innermost flange member 81 and extend into the space between the sprocket member 79 and the supporting plate 75, said stop pins being located at the same radial distance from the axis of the shaft member 78a, as shown in FIGURES 13 and 14. A first locking dog 89 is pivoted to the plate member 75 in the upper portion of the space between the sprocket member 79 and the plate member 75, on a pivot bolt 90 adjacent one side of the clutch assembly 72, for example, at the left side thereof, as viewed in FIGURE 13. The locking dog 89 is provided at its lower left corner, as viewed in FIGURE 13, with a stop lug 91 and the lower end portion of the dog 89 is shaped to at times lockingly engage with one of the pins 88 to limit clockwise rotation of the sprocket member 79, as viewed in FIGURE 13, being biased towards this position by a coiled spring 92 whose ends are seated in respective recesses provided therefor in the top portions of the locking dog 89 and the block 86, said block 86 being provided with a tapped bore 93 in which is engaged a stop screw 94 defining the bottom of the spring-receiving seat. The spring 92 has its end received in the bore 93 and abutting the stop screw 94 so as to provide a means for adjusting the tension on the spring 92. As shown in FIGURE 13, the lower end of the dog 89 will engage a stop pin 88 to prevent clockwise rotation of the sprocket member 79 and to hold the sprocket member in a position wherein the bottom tooth 80 thereof is drivingly engaged with the lower portion 74 of the sprocket chain 41. The remaining teeth 80 are free, so that consequently in this position of the sprocket member 79 the carriage assembly is driven in the direction of the lower portion 74 of sprocket chain 41, namely, to the left, as viewed in FIGURE 13, assuming that the lower portion 74 is moving in this direction. In FIGURE 5 the lower portion 74 of sprocket chain 41 moves toward the right and the upper portion 73 of said sprocket chain moves toward the left. Thus, in FIGURE 5, the clutch assembly and the carriage 66 on which it is mounted move toward the right, since the clutch assembly is drivingly engaged with the lower portion 74 of the sprocket chain.

A similar locking assembly is provided on the lower portion of the clutch supporting plate 75, comprising a locking dog 95 which is pivoted on a pivot bolt 96 secured to the supporting plate 75 and which has a top end formed with a stop lug 97 and shaped to at times lockingly engage with a pin 88, for example as illustrated in FIGURE 14. A biasing spring 97 is provided between the lower block member 87 and the lower end portion of the locking dog 95, seated in the same manner as the biasing spring 92 previously described, and acting to bias the locking dog 95 in a counterclockwise direction, as viewed in FIGURES 13 and 14. When one of the locking pins 88 is lockingly engaged with the top portion of the locking dog 95, for example as illustrated in FIGURE 14, as upper sprocket tooth 80 will be drivingly engaged with the top portion 73 of the sprocket chain 41 and the lower sprocket teeth will be free, so that the carriage assembly 66 will be moved toward the right, as viewed in FIGURE 14, and toward the left, as viewed in FIGURE 5, since the upper sprocket chain portion 73 moves toward the left as viewed in FIGURE 5.

Designated at 98 is a tripping arm which is mounted on the upper portion of the frame bar 24, the arm 98 being provided with a cushioned abutment end portion 99 which projects into the path of movement of the top end portion of the locking dog 89, acting to rotate said locking dog 89 to unlocking position, namely, in a clockwise direction, as viewed in FIGURE 14, when the upper end of said locking dog 89 engages said triggering portion 99. This is shown in FIGURE 14, where it is seen that the dog 89 is rotated sufficiently to release the locking pin 88 previously engaged by its lower end (as shown in FIGURE 13), so as to allow the sprocket member 79 to rotate through a sufficient angle in a clockwise direction by the driving force transmitted thereto by lower portion 74 of the sprocket chain 41 to bring one of the upper sprocket teeth 80 into driving engagement with the top portion 73 of the sprocket chain and to allow the next locking pin 88 to advance into locking engagement with the top portion of the lower locking dog 95, as shown in FIGURE 14. Thus, as the carriage assembly 66 reaches the limit of its movement to the right, as viewed in FIGURE 5, the clutch assembly 72 acts to disengage the carriage assembly from the top portion 73 of the sprocket chain and to drivingly engage with the lower portion 74 of said sprocket chain.

The opposite frame member 25 is provided with the inwardly extending trigger arm 100 having a cushioned contacting end portion 101 which is similarly engageable with the lower end of the locking dog 95 at the limit of the leftward movement of the carriage assembly 66, as viewed in FIGURE 5, to rotate the locking dog 95 away from locking engagement with the pin 88 previously engaged thereby. This swings the locking dog 95 in a clockwise direction from the position thereof shown in FIGURE 14, and allows the sprocket member 79 to again rotate in a clockwise direction, as viewed in FIGURE 14, to allow one of the sprocket teeth 80 to engage with the lower portion 74 of the sprocket chain, one of the pins engaging with the lower portion of the locking dog 89 to limit further rotation of the sprocket member 79 and to thus drivingly couple the carriage assembly 66 to the lower portion 74 of the sprocket chain whereby movement of the carriage assembly is reversed. Thus, the clutch assembly 72 acts to alternately couple the carriage assembly 66 to the top and bottom portions 73 and 74 of the sprocket chain 41, whereby to provide alternate right and left movement of the carriage assembly between the respective frame members 24 and 25, this movement being continuous as long as sprocket chain 41 is moving.

Figures 4, 12:
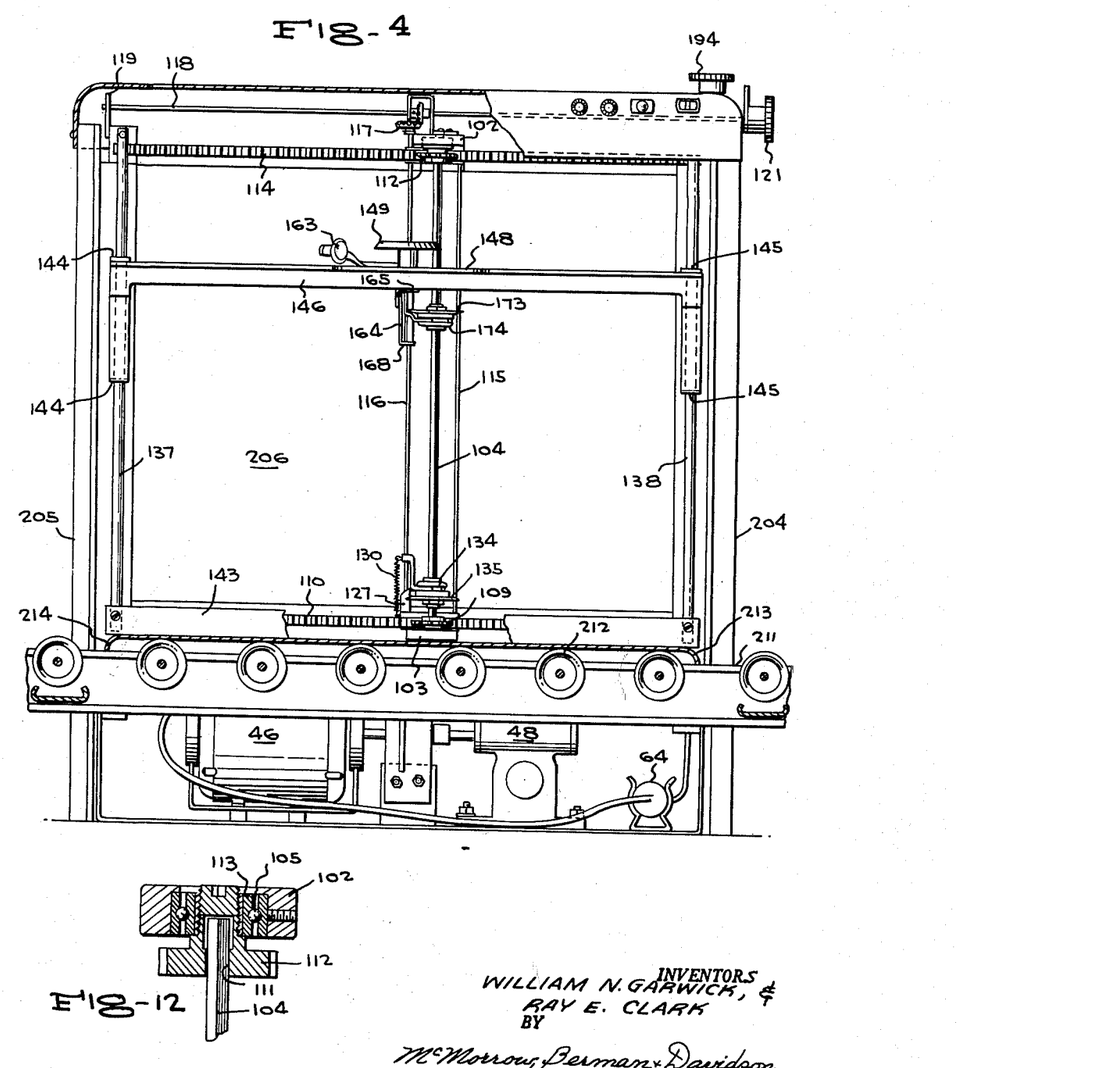
FIGURE 4 is an enlarged vertical cross sectional view taken substantially on the line 4—4 of FIGURE 1 and with parts partly broken away to better reveal structural details.
FIGURE 12 is an enlarged vertical cross sectional detail view taken on the line 12—12 of FIGURE 8.

Designated at 102 and 103 are respective horizontal forwardly extending arms secured to the top and bottom end portions of the vertical main carriage bar member 67, and designated at 104 is a vertical squared shaft which is journaled at its top and bottom ends in said arms 102 and 103, as by means of ball bearings shown respectively at 105 and 106 in FIGURES 12 and 11. As shown in FIGURE 11, the lower end of the squared shaft 104 is received in and non-rotatably supported by a bushing member 107 which is rigidly secured in the inner race 108 of the lower ball bearing assembly. Rigidly secured on the bushing member 107 is a pinion gear 109 which meshes with a horizontal rack bar 110 rigidly secured to and extending between the vertical main frame bars 24 and 25. The top end portion of the squared shaft 104 is non-rotatably received in a squared bore 111 formed in a top pinion gear 112 which is rigidly secured in the inner race element 113 of the top ball bearing assembly, as shown in FIGURE 12. The pinion gear 112 is in meshing engagement with a horizontal rack bar 114 rigidly secured to and extending between the upper portions of the main side frame bars 24 and 25. Thus, the squared vertical shaft 104 rotates responsive to the horizontal movement of the carriage member 66, above described because of the driving engagement of the pinion gears 112 and 109 with the rack bars 114 and 110.

Designated at 115 is a first vertical rod member which is rigidly secured to the inner corner portions of the top and bottom arms 102 and 103 at one side thereof. Designated at 116 is a second vertical rod member which is rotatably mounted in the inner corner portion of the bottom arm 103 and which extends rotatably through the inner corner portion of the top arm 102 at the opposite side of said arms, the top end of the rod member 116 being provided with a beveled gear 117. A horizontal rod 118 is rotatably supported on upstanding lugs 119 and 120 secured to the top ends of the main side bar members 24 and 25, as shown in FIGURE 5, and extends rotatably through the end wall of the top cover member 58, being provided at its outer end with an operating knob 121.

Designated at 122 is a bracket member of generally inverted U-shape which rotatably receives the horizontal rod 118 and which is provided with a horizontal bottom flange 123 which is rigidly secured on the top end of the main vertical bar member 67 of carriage 66, the bracket member 122 being partially disposed over the beveled gear 117, as shown in FIGURE 5. Meshing with the beveled gear 117 and splined on the horizontal shaft 118 is a beveled gear 124 which is retained between the parallel vertical arms of the bracket member 122, as shown in FIGURE 5, the gear 124 being axially slidable on the rod 118 so as to follow the movement of the carriage 66, but being rotatable by means of the knob 121 so that rotation may be transmitted through bevel gears 124 and 117 to the vertical rod member 116.

As shown in FIGURE 8, the top arm 102 is formed with a vertical bearing sleeve portion 125 through which the upper portion of the vertical rod member 116 extends. The bottom arm 103 is formed with an upstanding bearing sleeve portion 126 which rotatably receives the bottom end of the vertical rod member 116, as shown in FIGURE 11. Secured on the lower end portion of the vertical rod member 116 adjacent the bearing sleeve portion 126 is a cam sleeve 127 formed with a generally helical top camming surface 128. Splined on the rod member 116 immediately above the camming sleeve 127 is a cooperating camming sleeve 129 which is biased downwardly by a coiled spring 130 connecting its top end portion to the bottom bearing sleeve 126. Thus, rotation of the rod member 116 adjusts the height of the upper sleeve member 129 because of the camming cooperation of its lower end portion with the helical camming surface 128. Spring 130 biases the vertically movable camming sleeve 129 downwardly into contact with said helical camming surface 128.

Rigidly secured to the vertically adjustable sleeve member 129 is a yoke arm 131 which is formed with the generally arcuate yoke portion 132 which supportingly engages in an annular groove 133 provided in the hub 134 of a disc cutter 135 slidably engaged on the squared shaft 104 and having a squared central bore 136 which non-rotatably receives said squared shaft 104, as shown in FIGURES 10 and 11. As will be readily apparent, the height of the disc 135 may be regulated by rotating the control knob 121, since this causes the vertical splined rod 116 to be rotated, rotating the cam sleeve 127 with respect to the upwardly adjacent sleeve member 129. The sleeve member 129 is freely rotatable on the splined rod 116 so that it is free to move vertically by the camming action described above between the sleeve member 129 and the cam surface 128. It is further to be noted that the cutter hub 134 is freely rotatable in the arcuate yoke portion 132, so that the disc 135 rotates with the squared shaft 104.

Designated at 137 and 138 are a pair of relatively heavy vertical rod members which are provided forwardly adjacent the main frame bars 24 and 25, said rod members 137 and 138 being supported on rearwardly extending horizontal top and bottom rods 139 and 140 and 141 and 142 rigidly secured respectively to the top and bottom end portions of said vertical rods 137 and 138. The horizontal support rods 139 and 140 extend slidably through the top and bottom portions of the channel member 24 and the horizontal support rods 141 and 142 extend slidably through the top and bottom portions of the channel member 25.

Rigidly secured to the bottom end portions of the vertical rods 137 and 138 is a rearwardly facing channel member 143 which serves as a bottom stop means, as will be presently described. As shown in FIGURE 8, the pinion gear 109 is partially received inside the horizontally extending channel member 143.

Designated at 146 is an upper stop member which is generally Z-shaped in transverse cross section, as shown in FIGURE 8, and which is provided with apertured end lugs 145 and 144 slidably engaged on the rods 137 and 138, as shown in FIGURE 7. The vertical web portion of the member 146 is in vertical alignment with the vertical web portion of the bottom stop member 143. The intermediate portion of the top flange of the member 146 is formed with a forwardly extending lug 148 on which is secured a gripping knob, as shown in FIGURE 9.

The vertically adjustable stop member 146 is locked in adjusted position by arcuately curved clamping elements 150 and 151 respectively secured to the ends of a horizontal clamping rod 152 slidably supported on apertured brackets 153 secured to the vertical web portion of the member 146, as shown in FIGURE 9. The rod 152 extends slidably through the spaced arms of a generally U-shaped bracket 154 secured to the intermediate portion of the vertical web of member 146 and is biased towards clamping position by respective coil springs 155 and 156, bearing between the arms of the bracket member 154 and respective washers 157 and 158 mounted on rod 152 and restrained against movement thereon by suitable cotter pins, as shown in FIGURE 9. Thus, the springs 155 and 156 bias the rod 152 downwardly, as viewed in FIGURE 9, namely, in a direction to force the arcuate clamping elements 150 and 151 respectively against the rods 138 and 137.

A release lever 159 is pivoted at 160 to the intermediate portion of the member 146, said lever being provided with a slotted arm 161 which receives a pin 162 provided on the rod 152. The lever 159 is provided at its opposite end with a release knob 163, located adjacent the main adjusting knob 149, so that the release knob 163 may be actuated to rotate the lever 159 in a clockwise direction, as viewed in FIGURE 9, whereby to move the rod 152 upwardly, as viewed in FIGURE 9, against the force of the biasing springs 155 and 156, whereby to disengage the arcuate clamping elements 150 and 151 from the rods 138 and 137, to thus allow the member 146 to be vertically adjusted.

A generally U-shaped bracket member 164 is slidably engaged on the vertical rod 116 and has a top arm 165 which also slidably receives the vertical rod 115, as shown in FIGURE 7. The bracket member 164 is likewise provided with the bottom arm 168 which slidably receives the vertical rod 116, the top arm of the bracket member being of sufficient length so that it receives both the rod 116 and the rod 115. Designated at 169 is a bottom camming sleeve which is non-rotatably but slidably engaged on the shaft 116, being splined thereto, and resting on the bottom arm 168 of bracket member 164, as shown in FIGURE 8. Rotatably engaged on the shaft 116 above the sleeve 169 is another sleeve, member 170 which is biased into engagement with the sleeve 169 by a biasing spring 171 connecting the sleeve 170 to the bottom bracket arm 168. A bifurcated arm 172 is secured to the sleeve member 170 and slidably receives the bottom horizontal flange of the stop member 146. As shown in FIGURE 8, the top arm 165 of bracket member 164 overlies the arm 172, so that the assembly comprising the sleeves 169 and 170 is constrained to move vertically with the member 146 when the member 146 is adjusted in accordance with the height of a carton to be processed, as will be presently explained. The sleeve member 170 and 169 are formed with contacting cooperating camming surfaces so that the sleeve member 170 is elevated responsive to the rotation of the rod member 116 in the same manner that the bottom sleeve 129 is elevated when the rod member 116 is thus rotated, as previously explained. However, the camming surfaces of the sleeve members 169 and 170 are reversed with respect to the camming surfaces of the lower sleeve members 127 and 129, so that for a given direction of rotation of the rod member 116, the sleeve members 170 and 129 move vertically in opposite directions.

A top cutter disc 173 is provided, said cutter disc being mounted on a hub 174 formed with a squared central opening slidably and non-rotatably receiving the shaft 104, the hub 174 being supported on a yoke member 175 secured to the upper sleeve member 170 subjacent the bifurcated arm 172. The yoke member 175 supports the hub 174 in an adjusted position on the shaft 104 but allows said hub to rotate freely with the shaft 104.

As will be readily apparent, the spacing between the cutter discs 135 and 173 may be adjusted by means of the adjusting knob 121, since the camming sleeves 127 and 170 rotate with the splined shaft 116 and act simultaneously on the associated sleeve elements 129 and 170 to move the cutter discs 135 and 173 in opposite directions. As will be further apparent, the adjustment of the spacing between the cutter discs 134 and 173 can be performed regardless of the position of the upper guide member 146, since, as previously mentioned, the upper adjusting sleeve assembly comprising the sleeves 169 and 170 is vertically movable along with the member 146 when the member 146 is adjusted in accordance with the height of the carton to be processed.

As previously mentioned, the supporting rods 139, 140 and 141, 142 extend slidably through the upper and lower portions of the side bars 24 and 25. These members are biased rearwardly by coil springs 180 acting between the front flanges of the associated frame bars 24, 25 and washers 181 provided on the rods and restrained against rearward movement by suitable cotter pins. Thus, the coil springs 180 bias the vertical rods 137, 138 and the assemblies supported thereon to the left, as viewed in FIGURE 8, namely, in a rearward direction. Pivoted at 182 and 183 to the web of the vertical frame bar 25 are respective bell crank levers 184 and 185 having upwardly extending arms 186 and 187 which abut the ends of the rods 139 and 140. The remaining arms of the bell crank levers 184 and 185 have nut members 190 and 191 pivotally connected thereto which are threadedly engaged by a vertical threaded shaft 193 rotatably mounted on the vertical frame bar 25 and extending upwardly through the top cover 58, being provided at its top end with a control knob 194. Similar bell crank levers 196 and 197 are provided on the frame member 24, abutting the ends of the horizontal rod members 141 and 142 at their rearward arms 198 and 199, the forward arms of the bell crank levers 196 and 197 being connected together by a link rod 188. The upper bell crank levers 184 and 196 are rigidly connected together by the pivot shaft 182, which defines the pivotal connection of the bell crank levers to the top end portions of the upstanding frame bars 24 and 25. It will thus be seen that the bell crank levers 196 and 197 are connected together and are coupled directly to the bell crank lever 184, and that the bell crank lever 185 is likewise coupled to the bell crank lever 184 by its threaded connection to the common adjusting shaft 193. By rotating the adjusting knob 194, the four bell crank levers 184, 185, 196, 197 are simultaneously rotated in the same direction, whereby to provide forward or rearward adjustment of the members 143 and 146 responsive to the rotation of the control knob 194. As shown in FIGURE 8, this adjustment controls the depth of cut of the cutter discs 135 and 173 with respect to the wall of a carton held against the vertically aligned guide portions of the members 143 and 146.

As previously mentioned, the adjusting shaft 193 is rotatably supported on the vertical frame bar 25, for example, in the manner illustrated in FIGURE 6, so that the threaded adjusting member 193 may rotate but is held against axial movement. As shown in FIGURE 6, a supporting disc 200 is clamped in a fixed position surrounding the upper portion of the threaded shaft 193, as by a pair of clamping nuts 201, 201 engaged on the shaft 193 above and below the disc 200 so as to rigidly secure the disc in a fixed position on the shaft. A slotted bracket 202 is secured to the frame bar 25, the disc 200 engaging in the horizontal slot 203 of the bracket 202 so that the disc is supported in the bracket and hence supports the shaft 193 while allowing said shaft to rotate. A retaining bracket 205 is secured to the lower portion of the frame member 25 and rotatably receives the portion of shaft 193 below the supporting disc 200 so as to hold the shaft 193 in a vertical position.

As previously mentioned, the machine is provided with a top wall 58, as well as with a rear wall 44. The housing structure also includes the respective end walls 204 and 205′ and a vertical front wall 206 which is secured at its side marginal portions to the front flanges of the vertical side frame bars 24 and 25. As shown in FIGURE 7, vertical angle brackets 207 and 208 are secured over the side marginal portions of the front wall 206, and vertical corner brackets 209 and 210 are secured to the forwardly extending flanges of the angle brackets 207 and 208. The front corner portions of the vertical end walls 204 and 205′ extend around the vertical bracket bars 209 and 210, as shown in FIGURE 7, and the superimposed transverse vertical portions of the bracket bars 207, 209 and 208 and 210 provide a means for connecting the forward marginal portions of the end walls 204 and 205′ to the main framework of the machine.

Figures 1, 2, 3:
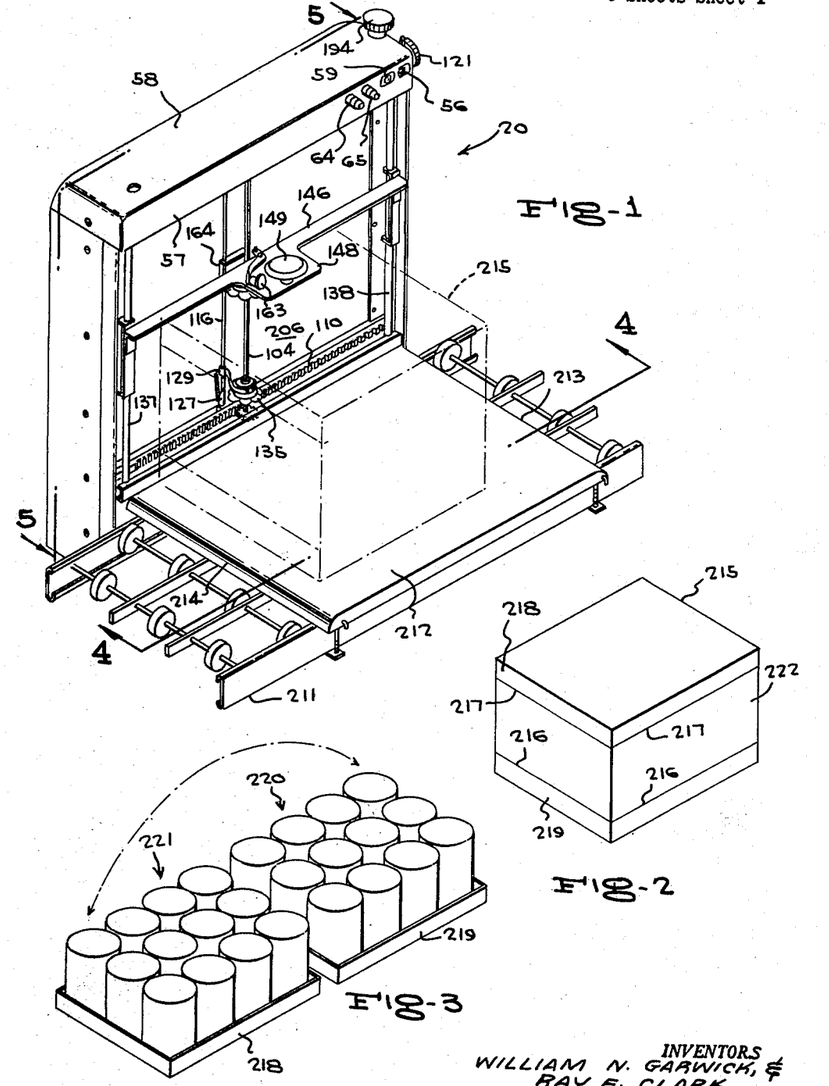
FIGURE 1 is a front perspective view of an improved carton cutting apparatus constructed in accordance with the present invention.
FIGURE 2 is a perspective view of a carton which has been cut, by the use of the apparatus of FIGURE 1, to define top and bottom supporting trays for the contents of the carton.
FIGURE 3 is a perspective view showing the top portion of the carton of FIGURE 2 and its contents rotated over the lower portion of the carton and its contents to define two separate trays, filled with cans, which may be separately handled and wherein the contents of the trays may be handled in bulk for subsequent processing, such as for marking and for arranging for display or sale.

As shown in FIGURE 1, a section of a conventional roller conveyor assembly 211 is secured to the lower portion of the main frame of the assembly extending forwardly thereof and being adapted to be connected in a conventional conveyor system so as to form a part thereof. Clamped on the section 211 directly in front of the carton cutting assembly is a table member 212 having the smoothly curved transverse end portions 213 and 214, the plate-like table member 212 being smoothly polished on its top surface so as to facilitate the movement of a carton thereon into a position abutting the vertically aligned guide surfaces of the top and bottom guide members 146 and 143.

In operation, a carton, shown for example at 215 in dotted view in FIGURE 1 is placed on the table member 212 with the top and bottom marginal portions of one wall thereof in abutment with the members 146 and 143, the member 146 having been adjusted so that the forwardly extending central top flange 148 thereof overlies the carton and is substantially in contact therewith. The motor 46 is energized, by closing the control switch 56, the energized condition of the motor being indicated by the illumination of the neon lamp 59. The rotary cutting blades 135 and 173 oscillate horizontally while rotating, as above described, thereby cutting horizontal slits 216 and 217 in the lower and upper portions of the wall of the carton, the cutting blades being located so as to cut said slits at equal distances from the top and bottom surfaces of the carton. After the slits 216 and 217 have been formed in the first wall of the carton, the carton is rotated manually through an angle of 90° to bring an adjacent wall into position for slitting, whereby the rotating cutter discs 135 and 173 repeat the cutting action and produce additional slits 216 and 217 communicating with the previously cut slits in said adjacent carton wall. The carton is again rotated manually to an angle of 90°, whereby additional slits are cut in the third vertical wall of the carton, after which the carton is again rotated 90° to finally complete the slitting of the carton so as to define top and bottom tray elements 218 and 219. The top tray element 218 and the layer of cans subjacent thereto may then be rotated through an angle of 180° in any suitable manner, with respect to the bottom tray 219, to define the two separate groups of cans shown at 220 and 221 in FIGURE 3, the group of cans 220 being supported on the bottom tray 219 and the group of cans 221 being supported on the top tray 218 of the slit carton shown in FIGURE 2. The intermediate portion 222 of the carton may be removed, so that the respective groups of cans 220 and 221 will be adequately exposed for proper display thereof.

As will be readily apparent, the rotation of the upper layer of cans and the tray 218 associated therewith to the position thereof shown in FIGURE 3 may be easily performed on the platform member 212, and the resulting trays of cans may be moved further along the conveyor towards their ultimate destination without the necessity of the operator leaving his working position in front of the machine. This makes it possible for a large number of carons of cans to be processed in a very short time and with a relatively small amount of effort on the part of the operator.

As previously mentioned, the top guide member 146 may be readily adjusted in accordance with the height of the carton or series of cartons to be processed, and the vertical spacing between the cutting discs 173 and 135 may be easily adjusted by means of the control knob 121, whereby to provide trays of the desired height. As previously mentioned, the depth of cut may be adjusted in accordance with the thickness of the walls of the cartons to be processed by means of the control knob 194.

The carton-supporting table 212 may be clamped onto the conveyor section 211 in any suitable manner. Thus, as shown in FIGURE 6, the machine 20 is rigidly secured on any suitable support, not shown, adjacent to the conveyor section 211 and the table element 212 is engaged with its rear marginal portion disposed beneath the lower guide member 143 and with its depending front flange 230 engaged over the front marginal portion of the conveyor section. A plurality of hook bolts 231 are engaged through suitable apertures provided therefor in the flange 230, the lower ends of the hook bolts extending through hooked bracket members 232 which are lockingly engaged over the inturned bottom flanges 233 of the front longitudinal vertical channels 234 of the conveyor section. Nuts 235 are provided on the bottom ends of the hook bolts 231 which, when tightened, bear against the horizontal bottom flanges of the brackets 232 and rigidly secure the depending front flange 230 of the table member 212 to the front portion of the conveyor section. The portion of the table member is engaged beneath the lower control member 143 as shown in FIGURE 6.

While a specific embodiment of a device for slitting a carton to form trays for the contents thereof has been disclosed in the foregoing description, it will be understood that various modifications within the spirit of the invention may occur to those skilled in the art. Therefore, it is intended that no limitations be placed on the invention except as defined by the scope of the appended claims.

We claim:

1. A tray pack cutter comprising a horizontal carton conveyor table, a vertical framework secured to one edge of said table, a pair of horizontally spaced vertical rods in said framework, a vertical driveshaft in said framework and positioned between said rods, a pair of horizontal rotary cutter blades nonrotatably but slidably mounted on said driveshaft, means mounting the upper of said cutter blades for slidable vertical movement on said rods, means associated with said upper cutter blades for retaining the same in a selected position on said rods, a carton top guide associated with said upper cutter blade and adapted to move therewith as a unit, said carton top guide extending outwardly from said framework and overlying said conveyor table, and adjustment means in said framework for simultaneously moving in opposite vertical directions the upper cutter blade relative to said carton top guide and the lower cutter blade relative to said conveyor table to position said cutter blades so that they are adapted to cut the vertical walls of a carton to form a pair of trays of identical depth.

2. The tray pack cutter of claim 1 in which means is provided for horizontally moving said driveshaft and cutter blades between said rods.

3. The tray pack cutter of claim 2 in which said last mentioned means comprises a horizontal track mounted in said framework, a carriage movably supported on said track, said driveshaft and cutter blades being mounted on said carriage, said driveshaft being automatically operable responsive to the movement of said carriage on said track, and means for automatically reversing the direction of horizontal motion of said carriage on said track when said carriage is positioned adjacent the ends of said track.

4. A tray pack cutter comprising a horizontal carton conveyor table, a vertical framework secured to one edge of said table, a pair of horizontally spaced vertical rods in said framework, a vertical driveshaft in said framework and positioned between said rods, a pair of horizontal rotary cutter blades nonrotatably but slidably mounted on said driveshaft, means mounting the upper of said cutter blades for slidable vertical movement on said rods, means associated with said upper cutter blade for retaining the same in a selected position on said rods, a carton top guide associated with said upper cutter blade and adapted to move therewith as a unit, said carton top guide extending outwardly from said framework and overlying said conveyor table, and adjustment means in said framework for adjusting the cutter blades vertically toward or away from one another, whereby said cutter blades are positioned to cut the vertical walls of a carton simultaneously to form a pair of trays.

5. The tray pack cutter of claim 4 in which means is provided for horizontally moving said driveshaft and cutter blades between said rods.

6. A tray pack cutter comprising a horizontal carton conveyor table, a vertical framework secured to one edge of said table, a vertically disposed rod in said framework, a vertical driveshaft rotatably mounted in said framework in spaced parallel relation to said rod, a pair of horizontal rotary cutter blades non-rotatably but slidably mounted on said driveshaft, means mounting the upper of said cutter blades for slidable vertical movement on said rod, means associated with said upper cutter blade for retaining the same in a selected position on said rod, a carton top guide associated with said upper cutter blade and adapted to move therewith as a unit, said carton top guide extending outwardly from said framework and overlying said conveyor table, and adjustment means in said framework for adjusting the cutter blades vertically toward or away from one another, whereby said cutter blades are positioned to cut the vertical walls of a carton simultaneously to form a pair of trays.

7. A tray pack cutter as set forth in claim 6 including means for horizontally moving said driveshaft and cutter blades relative to said rod.

8. A tray pack cutter comprising a horizontal carton conveyor table, a vertical framework secured to one edge of said table, a vertically disposed rod in said framework, a vertical driveshaft rotatably mounted in said framework in spaced parallel relation to said rod, a pair of horizontal rotary cutter blades non-rotatably but slidably mounted on said driveshaft, means mounting the upper of said cutter blades for slidable vertical movement on said rod, means associated with said upper cutter blade for retaining the same in a selected position on said rod, a carton top guide associated with said upper cutter blade and adapted to move therewith as a unit, said carton top guide extending outwardly from said framework and overlying said conveyor table, and means for adjusting the upper cutter blade vertically relative to the carton top guide and adjusting the lower cutter blade vertically relative to the conveyor table, whereby said cutters are positioned to cut the vertical walls of a carton below the top and above the bottom to form a pair of trays.

9. A tray pack cutter comprising a horizontal carton conveyor table, a vertical framework secured to one edge of said table, a pair of horizontally spaced vertical rods in said framework, a vertical driveshaft in said framework and positioned between said rods, a pair of horizontal rotary cutter blades non-rotatably but slidably mounted on said driveshaft, means mounting the upper of said cutter blades for slidable vertical movement on said rods, means associated with said upper cutter blade for retaining the same in a selected position on said rods, means cooperating with the top of the carton to measure the adjustment of the upper cutter blade vertically with respect to the top of the carton to predetermine the depth of tray cut by the cutter blade from the carton, and adjustment means in said framework for adjusting the cutter blades vertically toward or away from one another, whereby said cutter blades are positioned to cut the vertical walls of a carton simultaneously to form a pair of trays.

10. A tray pack cutter comprising a horizontal carton conveyor table, a vertical framework secured to one edge of said table, a vertically disposed rod in said framework, a vertical driveshaft rotatably mounted in said framework in spaced parallel relation to said rod, a pair of horizontal rotary cutter blades non-rotatably but slidably mounted on said driveshaft, means mounting the upper of said cutter blades for slidable vertical movement on said rod, means associated with said upper cutter blade for retaining the same in a selected position on said rod, means cooperating with the top of the carton to measure the adjustment of the upper cutter blade vertically with respect to the top of the carton to predetermine the depth of tray cut by the cutter blade from the carton, and adjustment means in said framework for adjusting the cutter blades vertically toward or away from one another, whereby said cutter blades are positioned to cut the vertical walls of a carton simultaneously to form a pair of trays.

11. A tray pack cutter comprising a horizontal carton conveyor table, a vertical framework secured to one edge of said table, a vertically disposed rod in said framework, a vertical driveshaft rotatably mounted in said framework in spaced parallel relation to said rod, a pair of horizontal rotary cutter blades non-rotatably but slidably mounted on said driveshaft, means mounting the upper of said cutter blades for slidable vertical movement on said rod, means associated with said upper cutter blade for retaining the same in a selected position on said rod, means cooperating with the top of the carton to measure the adjustment of the upper cutter blade vertically with respect to the top of the carton to predetermine the depth of tray cut by the cutter blade from the carton, and means for adjusting the upper cutter blade vertically relative to the carton and adjusting the lower cutter blade vertically relative to the conveyor table, whereby said cutter blades are positioned to cut the vertical walls of a carton below the top and above the bottom to form a pair of trays.

References Cited by the Examiner

UNITED STATES PATENTS

| | | | |
|---|---|---|---|
| 1,838,011 | 12/31 | St. Peter | 83—614 |
| 2,544,241 | 3/51 | Sternad et al. | 83—488 |
| 2,684,533 | 7/54 | Kern | 30—287 |
| 2,729,885 | 1/56 | Wahl et al. | 30—2 |
| 2,771,114 | 11/56 | Laberine | 83—8 |
| 2,866,504 | 12/58 | Syers | 93—917 |
| 2,936,664 | 5/60 | Myers | 83—614 |
| 3,135,048 | 6/64 | Daugherty et al. | 30—2 |
| 3,135,049 | 6/64 | Daugherty et al. | 30—2 |

FOREIGN PATENTS

| | | |
|---|---|---|
| 715,927 | 1/42 | Germany. |

WILLIAM FELDMAN, *Primary Examiner.*